(12) United States Patent
Kumagai et al.

(10) Patent No.: US 9,783,084 B2
(45) Date of Patent: Oct. 10, 2017

(54) VEHICLE SEAT SLIDE DEVICE

(71) Applicant: Aisin Seiki Kabushiki Kaisha, Kariya-shi (JP)

(72) Inventors: Koji Kumagai, Chiryu (JP); Takanori Sato, Kasugai (JP); Toshiyuki Tanaka, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/228,134

(22) Filed: Aug. 4, 2016

(65) Prior Publication Data

US 2017/0036568 A1    Feb. 9, 2017

(30) Foreign Application Priority Data

Aug. 6, 2015 (JP) ................. 2015-156505

(51) Int. Cl.
*F16M 13/00* (2006.01)
*B60N 2/08* (2006.01)
*B60N 2/07* (2006.01)

(52) U.S. Cl.
CPC ........... *B60N 2/0806* (2013.01); *B60N 2/073* (2013.01); *B60N 2/0705* (2013.01); *B60N 2/0715* (2013.01); *B60N 2/085* (2013.01); *B60N 2/0818* (2013.01); *B60N 2/0875* (2013.01); *B60N 2/0881* (2013.01)

(58) Field of Classification Search
USPC ...................................................... 248/429
See application file for complete search history.

(56) References Cited

U.S. PATENT DOCUMENTS

| | | | | |
|---|---|---|---|---|
| 6,520,474 B2 * | 2/2003 | Yoshida | ................. | B60N 2/071 248/424 |
| 6,588,722 B2 * | 7/2003 | Eguchi | ............... | B60N 2/01591 248/298.1 |
| 8,066,314 B2 * | 11/2011 | Tamura | ..................... | B60R 5/04 296/26.09 |
| 8,393,591 B2 * | 3/2013 | Mizuno | ................ | B60N 2/0705 248/424 |
| 8,469,328 B2 * | 6/2013 | Nakamura | ........... | B60N 2/0705 248/424 |

(Continued)

FOREIGN PATENT DOCUMENTS

JP     2015-107792     6/2015

*Primary Examiner* — Monica Millner
(74) *Attorney, Agent, or Firm* — Oblon, McClelland, Maier & Neustadt, L.L.P.

(57) ABSTRACT

A vehicle seat slide device includes: a first rail provided to extend in a front-rear direction of a vehicle and including first side wall portions, and first flanges overhanging from tips of the first side wall portions to inside and further folded to a base end side of the first side wall portions; a second rail joined to the first rail to be capable of moving in the front-rear direction and including second side wall portions, a connecting wall portion connecting base ends of the second side wall portions, and second flanges overhanging to an outside and further folded so as to be surrounded by the first side wall portions and the first flanges; and a locking member joined to the second rail to rotate around an axial line extending in the width direction and capable of restricting relative movement of the first and second rails.

2 Claims, 7 Drawing Sheets

(56) References Cited

U.S. PATENT DOCUMENTS

| | | | |
|---|---|---|---|
| 8,616,515 B2 * | 12/2013 | Hayashi | B60N 2/0705 248/424 |
| 8,894,032 B2 * | 11/2014 | Walter | B60N 2/0705 248/430 |
| 8,936,227 B2 * | 1/2015 | Kawamura | B60N 2/08 248/429 |
| 9,162,588 B2 * | 10/2015 | Yamada | B60N 2/0722 |
| 9,327,615 B2 * | 5/2016 | Yamada | B60N 2/0705 |
| 9,371,013 B2 * | 6/2016 | Nakamura | B60N 2/0705 |
| 9,457,691 B2 * | 10/2016 | Yamada | B60N 2/0732 |

\* cited by examiner

WIDTH
DIRECTION

VEHICLE SEAT SLIDE DEVICE

CROSS REFERENCE TO RELATED APPLICATIONS

This application is based on and claims priority under 35 U.S.C. §119 to Japanese Patent Application 2015-156505, filed on Aug. 6, 2015, the entire contents of which are incorporated herein by reference.

TECHNICAL FIELD

This disclosure relates to a vehicle seat slide device.

BACKGROUND DISCUSSION

In the related art, there is known a vehicle seat slide device which is disclosed in JP 2015-107792A (Reference 1), for example. The vehicle seat slide device is configured to include a lower rail, an upper rail, and a locking member. The lower rail is a first rail which extends in a front-rear direction of a vehicle, the upper rail is a second rail which is joined to the lower rail to be capable of moving, and the locking member is capable of restricting the movement of the upper rail.

Figure 7:
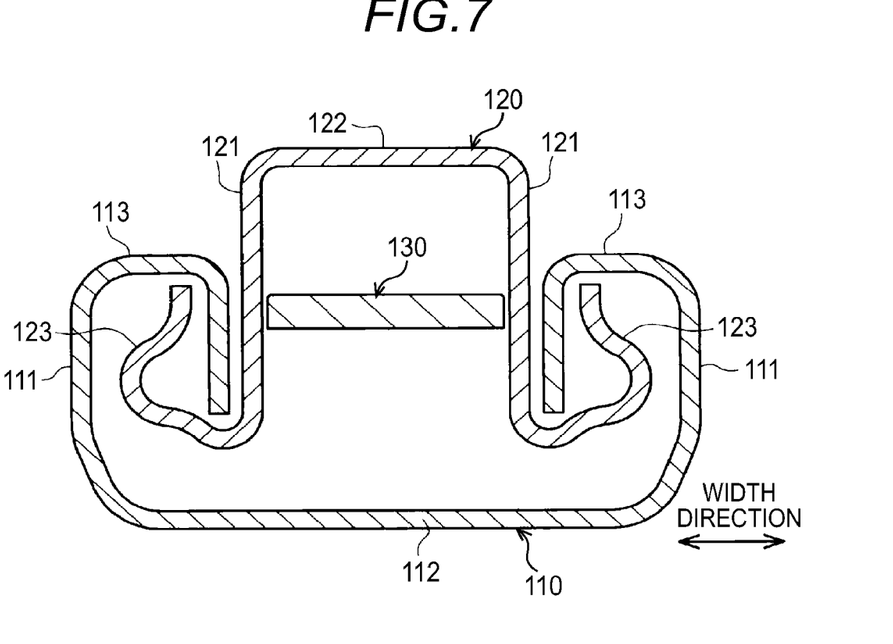
FIG. 7 is a sectional diagram illustrating the structure of a vehicle seat slide device of the related art.

In other words, as illustrated in FIG. 7, a lower rail 110 includes a pair of first side wall portions 111 which are lined up in a width direction, and a first connecting wall portion 112 which is separated from a upper rail 120 and connects base ends (bottom ends) of the first side wall portions 111 to each other. The lower rail 110 includes a pair of first flanges 113 which overhang to the inside in the width direction in which the first flanges 113 approach each other from the tips (the top ends) of the first side wall portions 111, and are further folded to the base end side of the first side wall portions 111.

The upper rail 120 includes a pair of second side wall portions 121 and a second connecting wall portion 122. The second side wall portions 121 are provided to line up in the width direction between the first flanges 113, and the second connecting wall portion 122 connects, in the width direction, the base ends (the top ends) of the second side wall portions 121 which distance from the lower rail 110. The upper rail 120 includes a pair of second flanges 123 which overhang to the outside in the width direction in which the second flanges 123 distance from each other from the tips (the bottom ends) of the second side wall portions 121, and are further folded so as to be surrounded by the first side wall portions 111 and the first flanges 113.

Both the lower rail 110 and the upper rail 120 have symmetrical (laterally symmetrical) rail cross sections in the width direction thereof, and are mainly prevented from dislocating in an up-down direction by the engagement of the first flanges 113 and the second flanges 123.

A locking member 130 is generally disposed inside the upper rail 120, and is joined to the upper rail 120 to rotate freely around an axial line extending in the width direction. Due to the lowering of a rear end portion of the locking member 130 together with rotation, the locking member 130 restricts the movement, and due to the rear end portion of the locking member 130 rising, the locking member 130 releases the restriction.

Figure 8A:
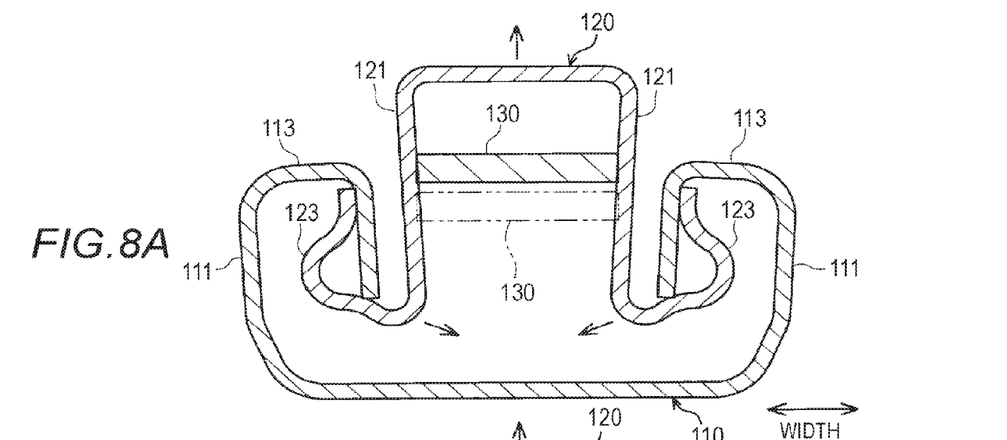
FIGS. 8A and 8B are sectional diagrams illustrating examples of the deformation of the vehicle seat slide device of the related art.
Figure 8B:
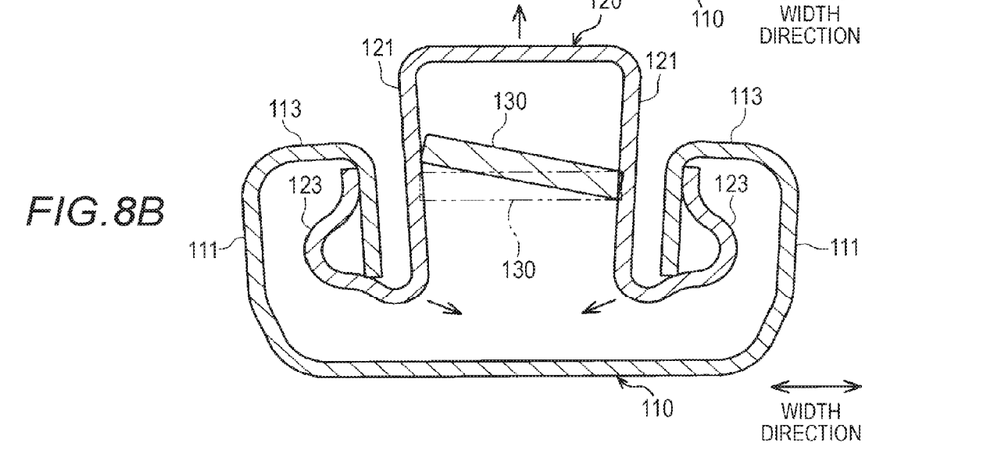

Incidentally, for example, when a significant load is input upward from the seat side (for example, a seatbelt) which is supported by the upper rail 120 due to a frontal collision of the vehicle or the like, as illustrated in FIGS. 8A and 8B, the opening end side of the upper rail 120 deforms to close to the inside in the width direction due to the upper rail 120 being pulled upward and meshing with the lower rail 110. At this time, when the locking member 130 which abuts (presses) against the second side wall portions 121 in accordance with the deformation is guided by the inclination of the second side wall portions 121 and has a tendency to move upward, or when the locking member 130 inclines such that a height difference arises in the width direction, it is possible that the original orientation may not be maintained.

SUMMARY

Thus, a need exists for a vehicle seat slide device which is not suspectable to the drawback mentioned above.

A vehicle seat slide device according to an aspect of this disclosure includes a first rail which is provided to extend in a front-rear direction of a vehicle and includes a pair of first side wall portions provided to line up in a width direction, and a pair of first flanges which overhang from tips of the first side wall portions to inside in the width direction in which the first flanges approach each other and are further folded to a base end side of the first side wall portions, a second rail which is joined to the first rail to be capable of moving in the front-rear direction of the vehicle and includes a pair of second side wall portions which are provided to line up in the width direction between the first flanges, a connecting wall portion which connects base ends of the second side wall portions which are distanced from the first rail to each other in the width direction, and a pair of second flanges which overhang to an outside in the width direction in which the second flanges distance from each other from the tips of the second side wall portions and are further folded so as to be surrounded by the first side wall portions and the first flanges, and a locking member which is joined to the second rail to rotate freely around an axial line extending in the width direction within the second rail and is capable of restricting relative movement of the first rail and the second rail, in which holes are formed in the second side wall portions so as to be open in the width direction, each of the holes including a front-side hole, a rear-side hole which is disposed to leave an interval to the rear of the front-side hole in the vehicle, and a communicating hole which communicates tips of the front-side hole and the rear-side hole distancing from the connecting wall portion with each other in the front-rear direction of the vehicle, and in which a pair of protruding portions, which are provided to protrude to an outside in the width direction on the locking member such that a separation distance between the protruding portions and the second side wall portions at positions of a pair of extending pieces which are formed in the second side wall portions through partitioning by the holes such that the communicating hole side is a free end is smallest, are provided.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, description will be given of an embodiment of a vehicle seat slide device. Hereinafter, a front-rear direction of the vehicle will be referred to as the "front-rear direction".

Figure 1:
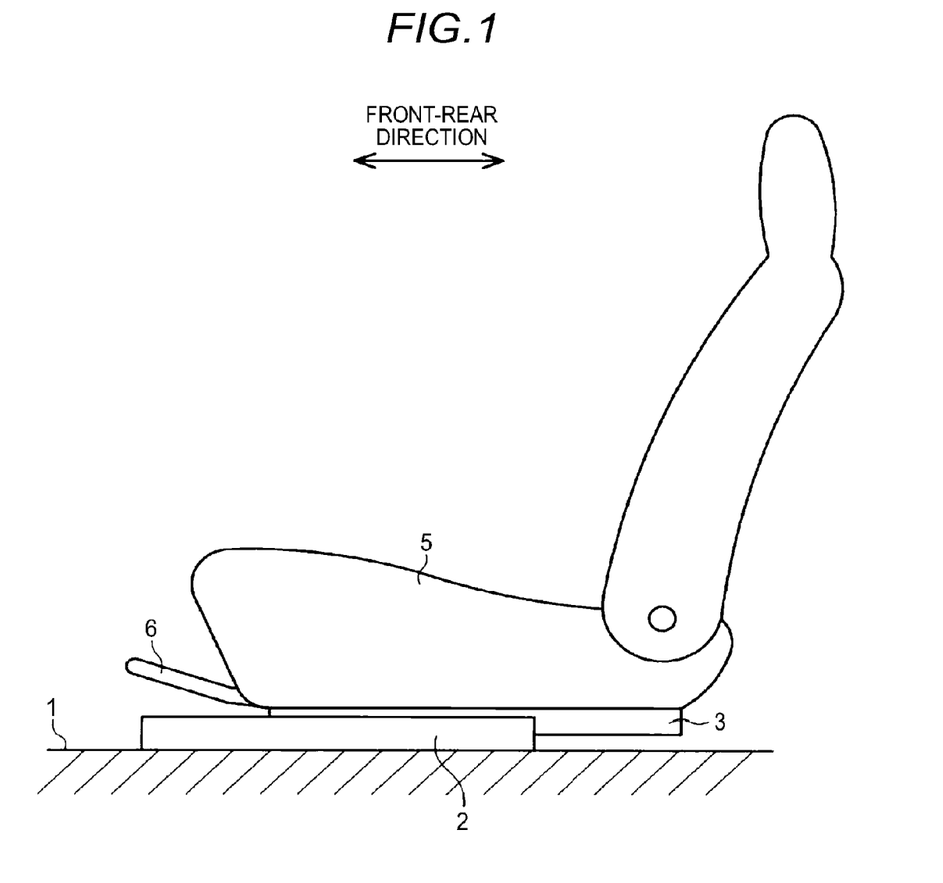
FIG. 1 is a side surface view illustrating a vehicle seat to which an embodiment of a vehicle seat slide device is applied.

As illustrated in FIG. 1, a lower rail 2 is fixed to a vehicle floor 1 in a state of extending in the front-rear direction, and an upper rail 3 is joined to the lower rail 2 to be capable of moving in the front-rear direction relative to the lower rail 2. The lower rail 2 is a first rail, and the upper rail 3 is a second rail. In other words, in the embodiment, a longitudinal direction (a relative movement direction) of the lower rail 2 and the upper rail 3 matches the front-rear direction.

The lower rail 2 and the upper rail 3 are both arranged in pairs in a width direction (a direction orthogonally intersecting the paper surface in FIG. 1), and here, those which are disposed on the left side as viewed when facing forward are illustrated. A seat 5 which forms a passenger seating portion is fixed to and supported by the upper rails 3. The relative movement between the lower rail 2 and the upper rail 3 is generally in a restricted state, and a release handle 6 is provided for releasing the restricted state.

Figure 2:
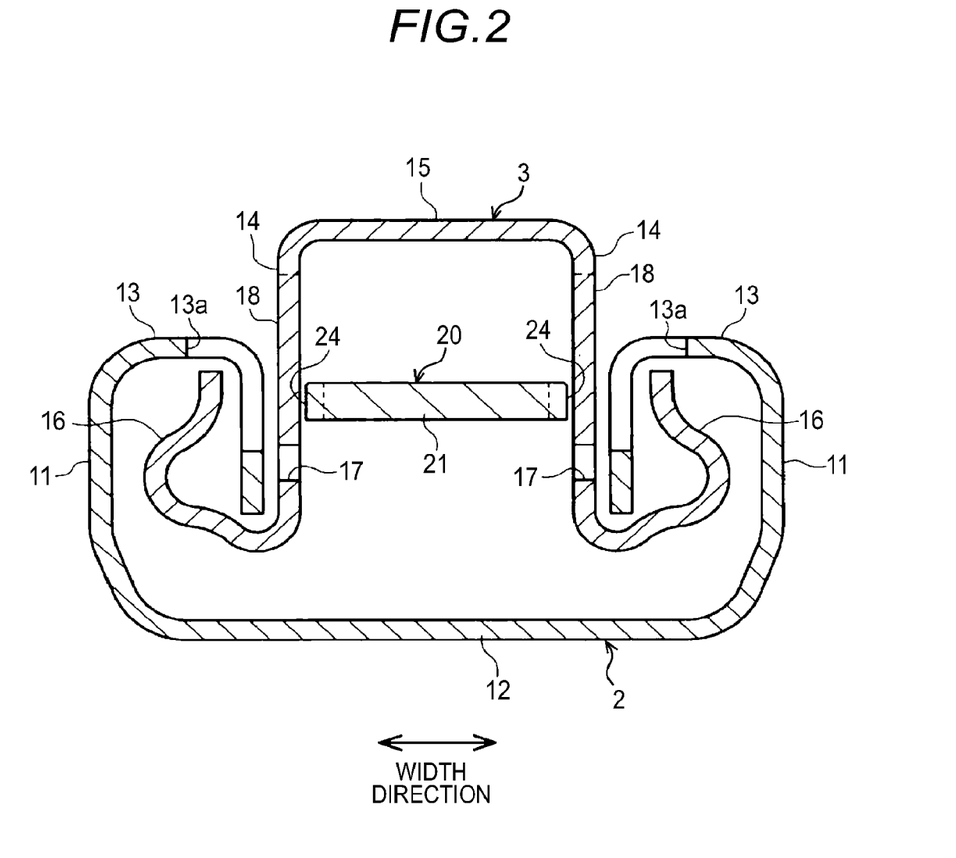
FIG. 2 is a sectional diagram taken along a 2-2 line of FIG. 4A.

As illustrated in FIG. 2, the lower rail 2 is formed of a plate material, and includes a pair of first side wall portions 11, and a base wall portion 12. The first side wall portions 11 extend in an up-down direction on both sides in the width direction, and the base wall portion 12 connects the base ends (the bottom ends) of the first side wall portions 11 to each other in the width direction. First flanges 13 which overhang to the inside in the width direction and are further folded to the base end side of the first side wall portions 11 are formed continuously on the tips (the top ends) of the first side wall portions 11.

Figure 3:
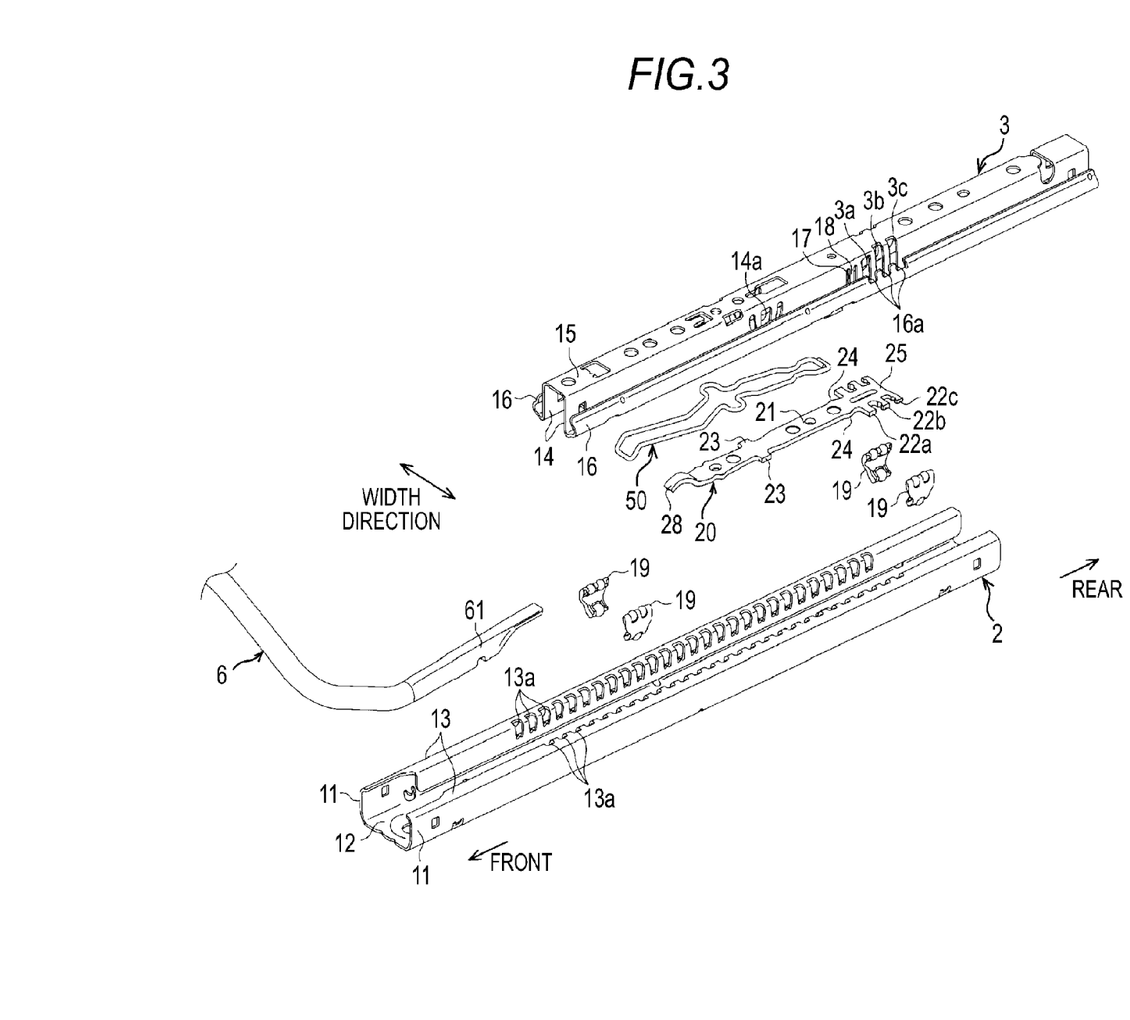
FIG. 3 is an exploded perspective diagram illustrating the structure of the vehicle seat slide device of the embodiment.

As illustrated in FIG. 3, a plurality of square lock holes 13a are formed on base end portions (top end portions) of the first flanges 13 of the lower rail 2 leaving a predetermined interval in the longitudinal direction. Each of the lock holes 13a is open upward, and is blocked downward.

As illustrated in FIG. 2, the upper rail 3 is formed of a plate material, and includes a pair of second side wall portions 14 and a cap wall portion 15. The pair of second side wall portions 14 extend in the up-down direction between the first flanges 13 of the lower rail 2, and the cap wall portion 15 is a connecting wall portion which connects the base ends (the top ends), which distance from the lower rail 2, of the second side wall portions 14, to each other in the width direction. A second flange 16 is continuously formed on the tip (the bottom end) of the base wall portion 12 side of each of the second side wall portions 14. The second flange 16 overhangs to the outside in the width direction, and further, is folded over so as to be surrounded by the first side wall portion 11 and the first flange 13.

In other words, the lower rail 2 and the upper rail 3 have U-shaped rail cross sections, the opening sides of which abut against each other, and are mainly prevented from dislocating in the up-down direction by the engagement of the first flanges 13 and the second flanges 16.

As illustrated in FIG. 3, a plurality of (three) lock claw holes 3a, 3b, and 3c which are provided to line up in the longitudinal direction are formed in a longitudinal direction middle portion of each side in the width direction of the upper rail 3. The interval between the lock claw holes 3a to 3c is approximately the same as the interval between the lock holes 13a. The lock claw holes 3a to 3c are formed to extend in the up-down direction along an area reaching a portion of the cap wall portion 15 from the second side wall portions 14, and are open in the width direction.

A plurality of (three) fitting grooves 16a which are provided to line up in the longitudinal direction are formed on the tip (the top end) of each of the second flanges 16 in positions corresponding to the lock claw holes 3a to 3c. The fitting grooves 16a are open upward. The fitting grooves 16a and the lock claw holes 3a to 3c are disposed in positions capable of matching the plurality of (three) lock holes 13a which are adjacent on the lower rail 2.

A shaft accommodating hole 14a is formed in each of the second side wall portions 14 closer to the front of the vehicle than the lock claw holes 3a to 3c. The shaft accommodating hole 14a is formed in a substantially isosceles trapezoidal shape which expands toward the top, and is open in the width direction.

Figure 4A:
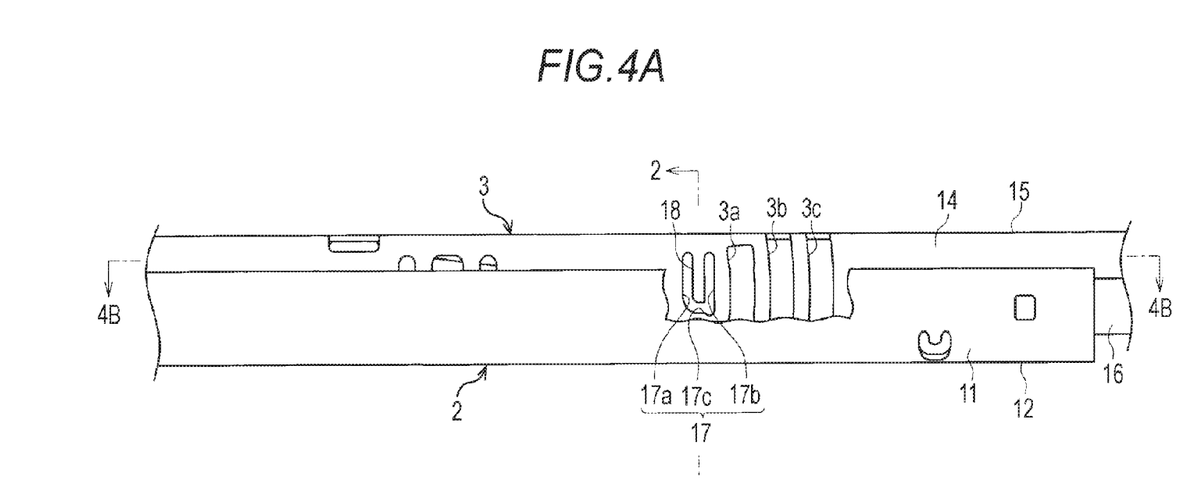
FIG. 4A is a side surface view illustrating the vehicle seat slide device of the embodiment with a portion of the structure thereof broken away.

A hole 17 which is open in the width direction is formed in each of the second side wall portions 14 adjacent to the lock claw holes 3a to the front of the vehicle. As illustrated in FIG. 4A, the hole 17 is substantially U-shaped and includes a linear front-side hole 17a, a linear rear-side hole 17b, and a substantially arc-shaped communicating hole 17c. The front-side hole 17a extends in the up-down direction, the rear-side hole is disposed to leave a space to the rear of the vehicle of the front-side hole 17a and extends in the up-down direction, and the communicating hole 17c communicates the tips, which are distanced from the cap wall portion 15, of the front-side hole 17a and the rear-side hole 17b, that is, the tips (the bottom ends) of the opening end side of the upper rail 3 with each other in the front-rear direction. A substantially arm-shaped extending piece 18 is formed in each of the second side wall portions 14 through partitioning by the hole 17. The extending piece 18 has a cantilever structure in which the bottom end (the communicating hole 17c side) is a free end, and the top end is a fixed end. The shape (the dimensions in the up-down direction and the width direction and the like) of the extending piece 18 is set such that the extending piece 18 warps when a large load is input.

As illustrated in FIG. 3, a pair of rotating members 19 is interposed, at both the front and the rear, between the second flanges 16 and the first side wall portions 11 facing the second flanges 16. The upper rail 3 is supported to be capable of sliding freely in the front-rear direction in relation to the lower rail 2 in a state causing the rotating members 19 to rotate between the upper rail 3 and the lower rail 2.

Figure 4B:
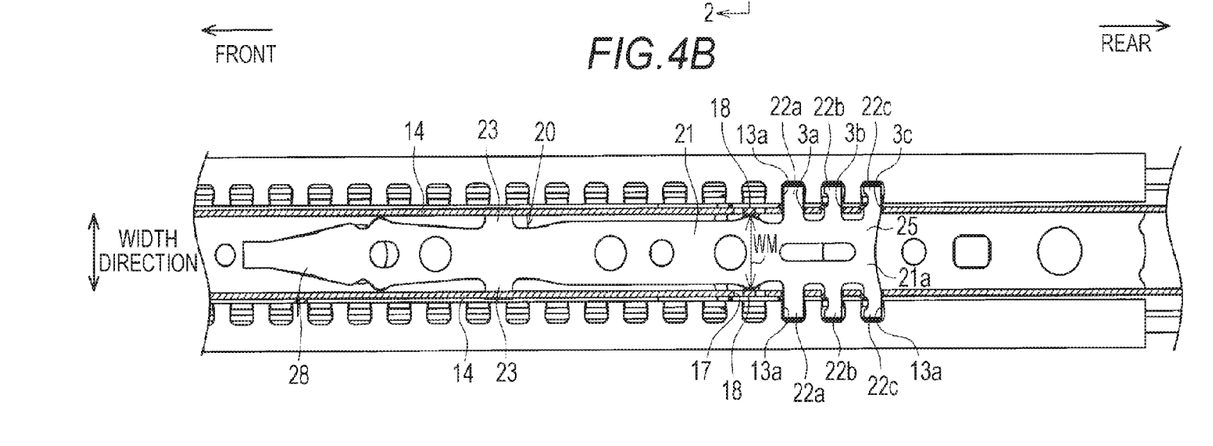
FIG. 4B is a sectional diagram taken along line 4B-4B of FIG. 4A.

As illustrated in FIG. 4B, a locking member 20 formed of a plate material is disposed inside the upper rail 3 to be parallel to the longitudinal direction of the upper rail 3. The locking member 20 is generally disposed on the inside in the width direction of the second side wall portions 14, and is joined to the upper rail 3 to rotate freely.

In other words, the locking member 20 includes a main body portion 21, a pair of a set of lock claws 22a, 22b, and 22c, a pair of substantially rectangular rotating shaft portions 23, a pair of substantially curved protruding portions 24, and an input portion 28.

The main body portion 21 is formed in a substantially rectangular plate shape extending in the front-rear direction, and the dimension of the width direction of the main body portion 21 is set to be smaller than the distance in the width direction between the second side wall portions 14 of the upper rail 3. The rotating shaft portions 23 are provided to protrude to the outside in the width direction in the front-rear direction middle portion of the main body portion 21. The locking member 20 is joined to the upper rail 3 to be capable of rotating freely in the up-down direction around an axial line (the rotating shaft portions 23) extending in the width direction due to the rotating shaft portions 23 being inserted into the shaft accommodating holes 14a of the upper rail 3.

The lock claws 22a to 22c are disposed on a rear end portion 21a of the main body portion 21. In other words, the lock claws 22a to 22c are provided to protrude to the outside in the width direction of the rear end portion 21a. The lock claws 22a to 22c of each side are disposed at the same interval as the lock holes 13a of the lower rail 2 along the longitudinal direction. Together with the rear end portion 21a, the pair of lock claws 22a to 22c form a locking portion 25.

The lock claws 22a to 22c pass through the lock claw holes 3a to 3c, and are fitted into the three fitting grooves 16a. When the locking member 20 rotates around the rotating shaft portions 23 such that the locking portion 25 descends, the lock claws 22a to 22c are capable of fitting into three of the lock holes 13a which are adjacent to each other. When the lock claws 22a to 22c are fitted into the lock holes 13a (corresponding to the state illustrated in FIG. 4B), the relative movement between the lower rail 2 and the upper rail 3 is restricted. Meanwhile, when the locking member 20 rotates around the rotating shaft portions 23 such that the locking portion 25 rises, the lock claws 22a to 22c are capable of detaching from the lock holes 13a. When the lock claws 22a to 22c detach from the lock holes 13a, the restriction of the relative movement between the lower rail 2 and the upper rail 3 is released.

The protruding portions 24 are provided adjacent to the locking portion 25 to the front of the vehicle and protrude to the outside on the main body portion 21 in the width direction. A dimension WM in the width direction of the locking member 20 at the apexes (the most protruding portions) of the protruding portions 24 is set to be slightly smaller than the separation distance between the second side wall portions 14 in the width direction. The dimension WM in the width direction is a maximum value of the dimension of the width direction of the locking member 20 excluding the locking portion 25. The positions of the protruding portions 24 in the front-rear direction match the positions of the extending pieces 18 in the front-rear direction. In other words, in the locking member 20, the separation distance between the locking member 20 and the second side wall portions 14 is smallest at the protruding portions 24 which match the positions of the extending pieces 18 in the front-rear direction.

The input portion 28 is formed on the end portion (the front end portion) of the opposite side from the rear end portion 21a in the main body portion 21.

As illustrated in FIG. 3, a lock spring 50 formed of a single wire material is disposed inside the upper rail 3. The lock spring 50 is formed to be substantially ring shaped, extending in the front-rear direction, and is held by the upper rail 3 at the middle portion in the longitudinal direction of the lock spring 50. The lock spring 50 abuts against the top surface of the locking member 20 at the rear end portion, and thus, biases the locking member 20 in the rotation direction of the side to which the locking portion 25 descends, that is, the side at which the lock claws 22a to 22c fit into the lock holes 13a.

A tip portion 61 of each side in the width direction of the release handle 6 extends to the rear of the vehicle and is inserted into the upper rail 3. At this time, the rear end of the tip portion 61 is positioned above the input portion 28. When the release handle 6 is operated so as to be lifted up, the tip portion 61 pushes the input portion 28 of the locking member 20 in the rotation direction of the side at which the locking portion 25 rises against the biasing force of the lock spring 50, that is, the side at which the lock claws 22a to 22c separate from the lock holes 13a.

Here, the operational force of the release handle 6 is released. At this time, due to the biasing force of the lock spring 50, the locking member 20 rotates in the rotation direction of the side at which the locking portion 25 descends around the rotating shaft portions 23, that is, the side at which the lock claws 22a to 22c are fitted into the lock holes 13a, and thus, the relative movement between the lower rail 2 and the upper rail 3 is restricted as described above. The position in the front-rear direction of the seat 5 which is supported by the upper rails 3 is held.

Subsequently, when the release handle 6 is operated so as to be lifted up, the tip portion 61 thereof pushes the input portion 28 of the locking member 20 downward. At this time, against the biasing force of the lock spring 50, the locking member 20 rotates to the side at which the locking portion 25 rises around the rotating shaft portions 23, that is, the side at which the lock claws 22a to 22c detach from the lock holes 13a, and thus, the restriction of the relative movement between the lower rail 2 and the upper rail 3 is released as described above. It becomes possible to adjust the position in the front-rear direction of the seat 5 which is supported by the upper rails 3.

Next, description will be given of the operations of the embodiment.

Figure 5:
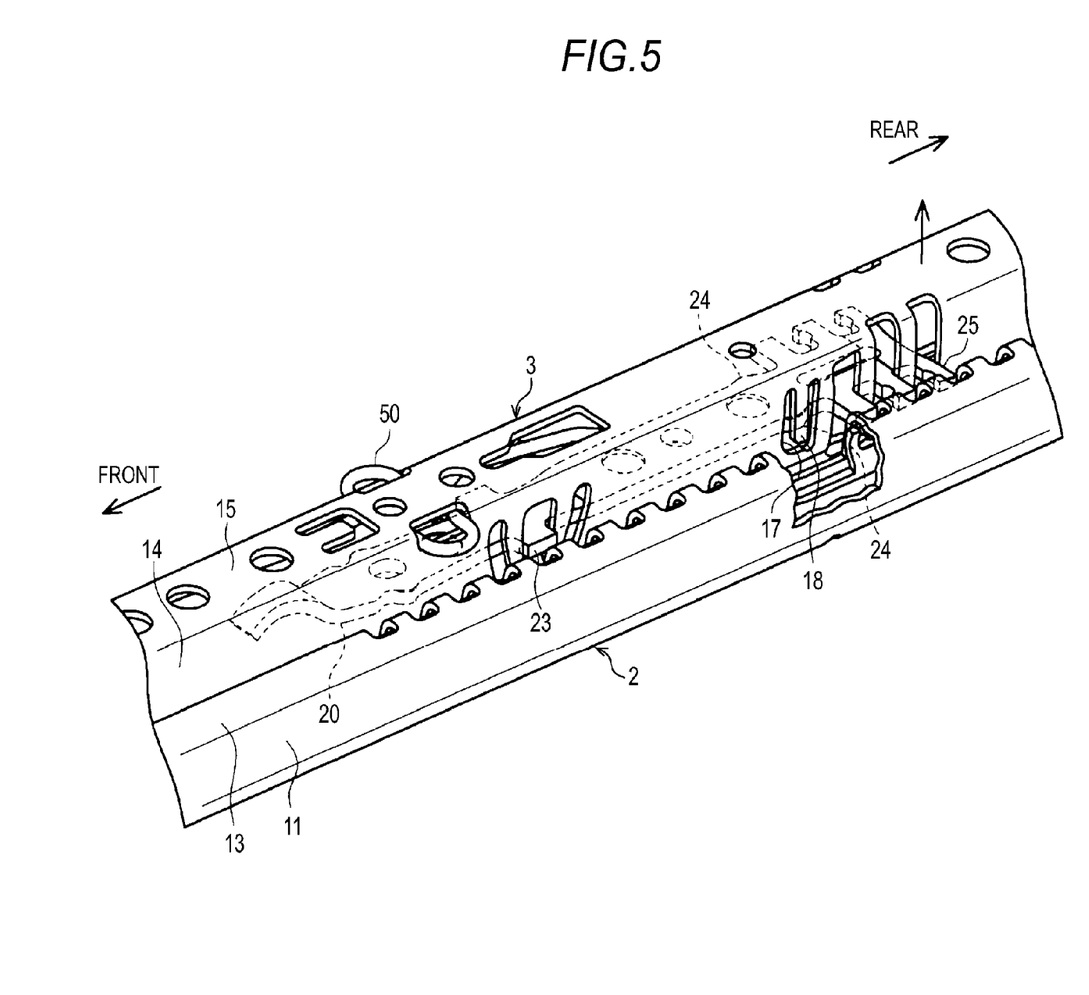
FIG. 5 is a perspective diagram illustrating the effects of the vehicle seat slide device of the embodiment with a portion of the vehicle seat slide device broken away.
Figure 6:
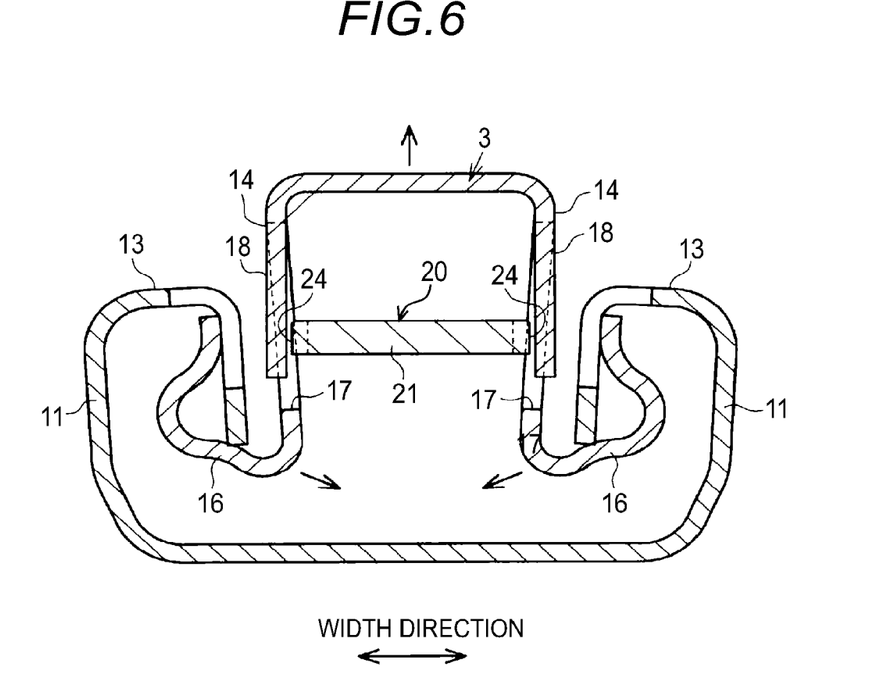
FIG. 6 is a sectional diagram illustrating the effects of the vehicle seat slide device of the embodiment.

As illustrated in FIGS. 5 and 6, for example, when a load is input toward the up-down direction of the side which causes the lower rail 2 and the upper rail 3 to separate due to a frontal collision of the vehicle or the like, the upper rail 3 is pulled in the same direction and the open end side of the upper rail 3 deforms to close to the inside in the width direction. At this time, the upper rail 3 and the locking member 20 abut (press) against each other at the extending pieces 18 and the protruding portions 24 at which the separation distance is generally smallest. When the extending pieces 18 abut (press) against the protruding portions 24 in accordance with the deformation, due to the extending pieces 18 being bent and deforming relative to each other with the fixed ends thereof (the base ends of the opposite sides of the communicating holes 17c in the up-down direction) serving as the origin of the bending, further deformation of the extending pieces 18 following the deformation (the closing deformation) described earlier is suppressed. In this manner, regardless of the deformation (the closing deformation) of the upper rail 3, by effectively maintaining the abutting (pressing) orientation against the protruding portions 24 while undergoing the bend deformation described earlier, the extending pieces 18 are capable of further stabilizing the orientation of the locking member 20.

According to the embodiment, as described in detail above, it is possible to obtain the following effects.

(1) In this embodiment, for example, during a frontal collision of the vehicle or the like, it is possible to further stabilize the orientation of the locking member 20.

(2) In this embodiment, the protruding portions 24 are disposed closer to the rear of the vehicle than the rotating shaft portions 23 (the axial line of rotation of the locking member 20) adjacent to the locking portion 25 to the front of the vehicle. In other words, due to the protruding portions 24 being disposed in positions most distanced from an axial line of rotation of the locking member 20 to the rear of the vehicle to an extent which does not impede the operation of the locking member 20, it is possible to more effectively stabilize the orientation of the locking member 20.

Ordinarily, during a frontal collision of the vehicle, since the closing deformation of the upper rail 3 generally proceeds from the rear toward the front, it is possible to stabilize the orientation of the locking member 20 at an earlier stage of the progression of the deformation.

(3) In this embodiment, due to the closing deformation (so-called separating deformation) of the upper rail 3 excluding the positions of the extending pieces 18 in the front-rear direction being the same as in the related art, it is possible to suppress dislocation from an ideal closing deformation which is anticipated during the designing, for example.

(4) In this embodiment, due to the extending pieces 18 not making contact with the protruding portions 24 in the static state or the ordinary state of the locking member 20, the extending pieces 18 do not influence the locking member 20. Meanwhile, when the locking member 20 wobbles in the width direction, for example, the protruding portions 24 abut against the extending pieces 18. In this case, the extending pieces 18 are capable of suppressing the wobbling of the locking member 20 through the protruding portions 24 without warping. When the protruding portions 24 abut against the extending pieces 18, the extending pieces 18 are capable of suppressing the wobbling of the locking member 20 through the protruding portions 24 even while warping if the warping is within the scope of elastic deformation.

The embodiment may be changed in the following manner.

In the embodiment, a substantially U-shaped hole 17 is adopted; however, for example, a substantially rectangular or substantially trapezoidal hole 17 may be adopted. For example, the front-side hole 17a and the rear-side hole 17b are shaped to extend linearly in the up-down direction; however, either or both may be shaped to extend linearly inclined in relation to the up-down direction. Alternatively, either or both the front-side hole 17a and the rear-side hole 17b may be substantially triangular. The communicating hole 17c is substantially arc-shaped so as to be convex downward; however, the communicating hole 17c may be shaped to extend linearly in the front-rear direction. The extending piece 18 which is formed in the second side wall portion 14 through partitioning by the hole 17 may extend in the up-down direction with the dimension of the front-rear direction being fixed, and may extend in the up-down direction with the dimension of the front-rear direction gradually changing.

In the embodiment, the hole 17 (the front-side hole 17a and the rear-side hole 17b) may extend in the up-down direction over an area extending from the second side wall portion 14 to a portion of the cap wall portion 15. In other words, the fixed end of the extending piece 18 may be positioned on the cap wall portion 15.

In the embodiment, the positions in the front-rear direction of the protruding portions 24 of the locking member 20 (and the extending pieces 18 of the upper rail 3 or the like) are arbitrary. For example, as long as the protruding portions 24 are positioned closer to the rear of the vehicle than the rotating shaft portions 23, the protruding portions 24 may not be disposed adjacent to the locking portion 25 to the front of the vehicle. Alternatively, the protruding portions 24 may be positioned closer to the front of the vehicle than the rotating shaft portions 23.

In the embodiment, the fixing relationship (that is, the vertical disposition relationship) between the lower rail 2 and the upper rail 3 and the vehicle floor 1 and the seat 5 may be reversed. In this case, the release operation of the locking member 20 which is arranged on the vehicle floor 1 side (the second rail) may be performed from an appropriate operation member through a cable or the like, for example.

In the embodiment, the lower rail 2 and the upper rail 3 (the vehicle seat slide device) may be configured such that one of each is arranged for the seat 5, and may be configured such that three or more of each is arranged for the seat 5.

In the embodiment, the seat 5 which is supported by the upper rail 3 may face the rear of the vehicle. In other words, the front-rear direction of the upper rail 3 and the like may not necessarily match the front-rear direction of the seat 5 as long as the front-rear direction of the upper rail 3 matches the front-rear direction of the vehicle.

A vehicle seat slide device according to an aspect of this disclosure includes a first rail which is provided to extend in a front-rear direction of a vehicle and includes a pair of first side wall portions provided to line up in a width direction, and a pair of first flanges which overhang from tips of the first side wall portions to inside in the width direction in which the first flanges approach each other and are further folded to a base end side of the first side wall portions, a second rail which is joined to the first rail to be capable of moving in the front-rear direction of the vehicle and includes a pair of second side wall portions which are provided to line up in the width direction between the first flanges, a connecting wall portion which connects base ends of the second side wall portions which are distanced from the first rail to each other in the width direction, and a pair of second flanges which overhang from an outside in the width direction in which the second flanges distance from each other from the tips of the second side wall portions and are further folded so as to be surrounded by the first side wall portions and the first flanges, and a locking member which is joined to the second rail to rotate freely around an axial line extending in the width direction within the second rail and is capable of restricting relative movement of the first rail and the second rail, in which holes are formed in the second side wall portions so as to be open in the width direction, each of the holes including a front-side hole, a rear-side hole which is disposed to leave an interval to the rear of the front-side hole in the vehicle, and a communicating hole which communicates tips of the front-side hole and the rear-side hole distancing from the connecting wall portion with each other in the front-rear direction of the vehicle, and in which a pair of protruding portions, which are provided to protrude to an outside in the width direction on the locking member such that a separation distance between the protruding portions and the second side wall portions at positions of a pair of extending pieces which are formed in the second side wall portions through partitioning by the holes such that the communicating hole side is a free end is smallest, are provided.

According to this configuration, for example, when a load is input toward the up-down direction of the side which causes the first rail and the second rail to separate due to a frontal collision of the vehicle or the like, the second rail is pulled in the same direction and the open end side of the second rail deforms to close to the inside in the width direction. At this time, the second rail and the locking member abut (press) against each other at the extending pieces and the protruding portions at which the separation distance is generally smallest. When the extending pieces abut (press) against the protruding portions in accordance with the deformation, due to the extending pieces being bent and deforming relative to each other with the fixed ends thereof (the base ends of the opposite sides of the communicating holes in the up-down direction) serving as the origin of the bending, further deformation of the extending pieces following the deformation (the closing deformation) described earlier is suppressed. In this manner, regardless of the deformation (the closing deformation) of the second rail, by effectively maintaining the abutting (pressing) orientation against the protruding portions while undergoing the bend deformation described earlier, the extending pieces are capable of further stabilizing the orientation of the locking member.

In the vehicle seat slide device, it is preferable that the locking member is configured to restrict and release relative movement between the first rail and the second rail due to a locking portion which is provided on a rear end portion engaging with and disengaging from the first rail in accordance with rotation, and the protruding portions are disposed closer to a rear of the vehicle than an axial line of the rotation of the locking member and adjacent to the locking portion to the front of the vehicle.

According to this configuration, due to the protruding portions being disposed adjacent to the locking portion to the front of the vehicle, the locking portion being involved in the engagement and disengagement with the first rail, that is, due to the protruding portions being disposed in positions most distanced from an axial line of rotation of the locking member to the rear of the vehicle to an extent which does not impede the operation of the locking member, it is possible to more effectively stabilize the orientation of the locking member.

The aspect of this disclosure has an advantage that the orientation of the locking member is further stabilized.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle seat slide device for a vehicle, comprising:
    a first rail which is provided to extend in a front-rear direction of the vehicle and includes a pair of first side wall portions provided to line up in a width direction of the vehicle, and a pair of first flanges which overhang from tips of the first side wall portions to inside in the width direction in which the first flanges approach each other and are further folded to a base end side of the first side wall portions;
    a second rail which is joined to the first rail, the second rail is configured to move in the front-rear direction of the vehicle and includes a pair of second side wall portions which are provided to line up in the width direction between the first flanges, a connecting wall portion which connects base ends of the second side wall portions which are distanced from the first rail to each other in the width direction, and a pair of second flanges which overhang to an outside in the width direction in which the second flanges distance from each other from tips of the second side wall portions and are further folded so as to be surrounded by the first side wall portions and the first flanges; and
    a locking member which is joined to the second rail to rotate freely around an axial line extending in the width direction within the second rail, the locking member is configured to restrict relative movement of the first rail and the second rail,
    wherein holes are formed in the second side wall portions so as to be open in the width direction, each of the holes including a front-side hole having a top end and a bottom end, a rear-side hole having a top end and a bottom end, the rear-side hole is disposed to leave an interval to a rear of the front-side hole in the vehicle, and a communicating hole, the communicating hole connects the bottom end of the front-side hole with the bottom end of the rear-side hole in the front-rear direction of the vehicle, the bottom end of the front-side hole is located further from the connecting wall portion than is the top end of the front-side hole, and the bottom end of the rear-side hole is located further from the connecting wall portion than is the top end of the rear-side hole, and
    wherein a pair of protruding portions protrude to an outside in the width direction on the locking member such that a separation distance between the protruding portions and the second side wall portions is smallest at positions of a pair of extending pieces, the extending pieces are formed in the second side wall portions through partitioning by the holes such that an end of each of the extending pieces that faces the communicating hole is a free end.

2. The vehicle seat slide device for a vehicle according to claim 1,
    wherein the locking member is configured to restrict and release relative movement between the first rail and the second rail due to a locking portion which is provided on a rear end portion engaging with and disengaging from the first rail in accordance with rotation, and
    wherein the protruding portions are disposed closer to a rear of the vehicle than an axial line of the rotation of the locking member and adjacent to the locking portion to a front of the vehicle.

* * * * *